Inventors
Thomas C. Jednacz
Alwin B. Newton

By *James J. Jennings, Jr.*
Attorney

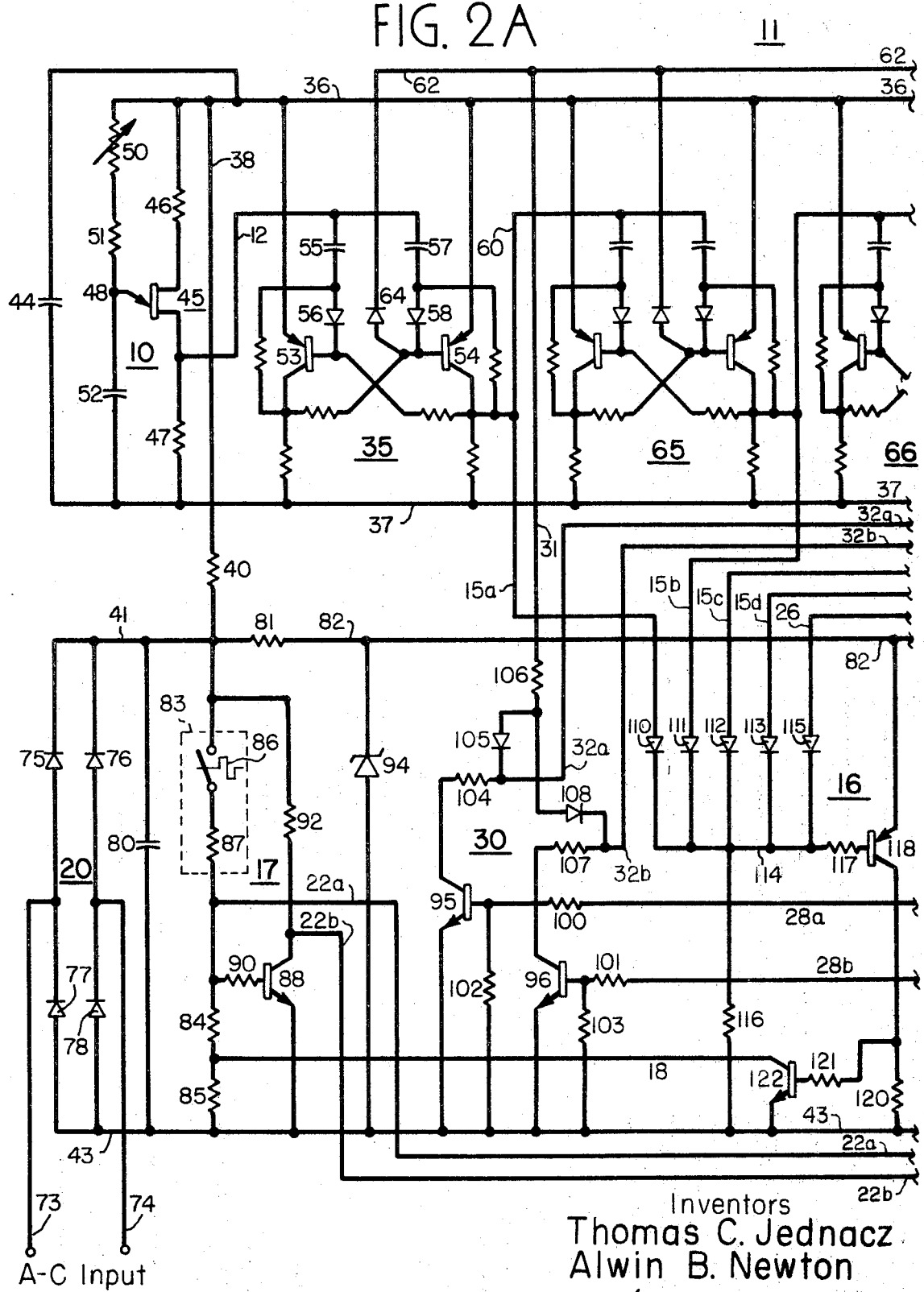

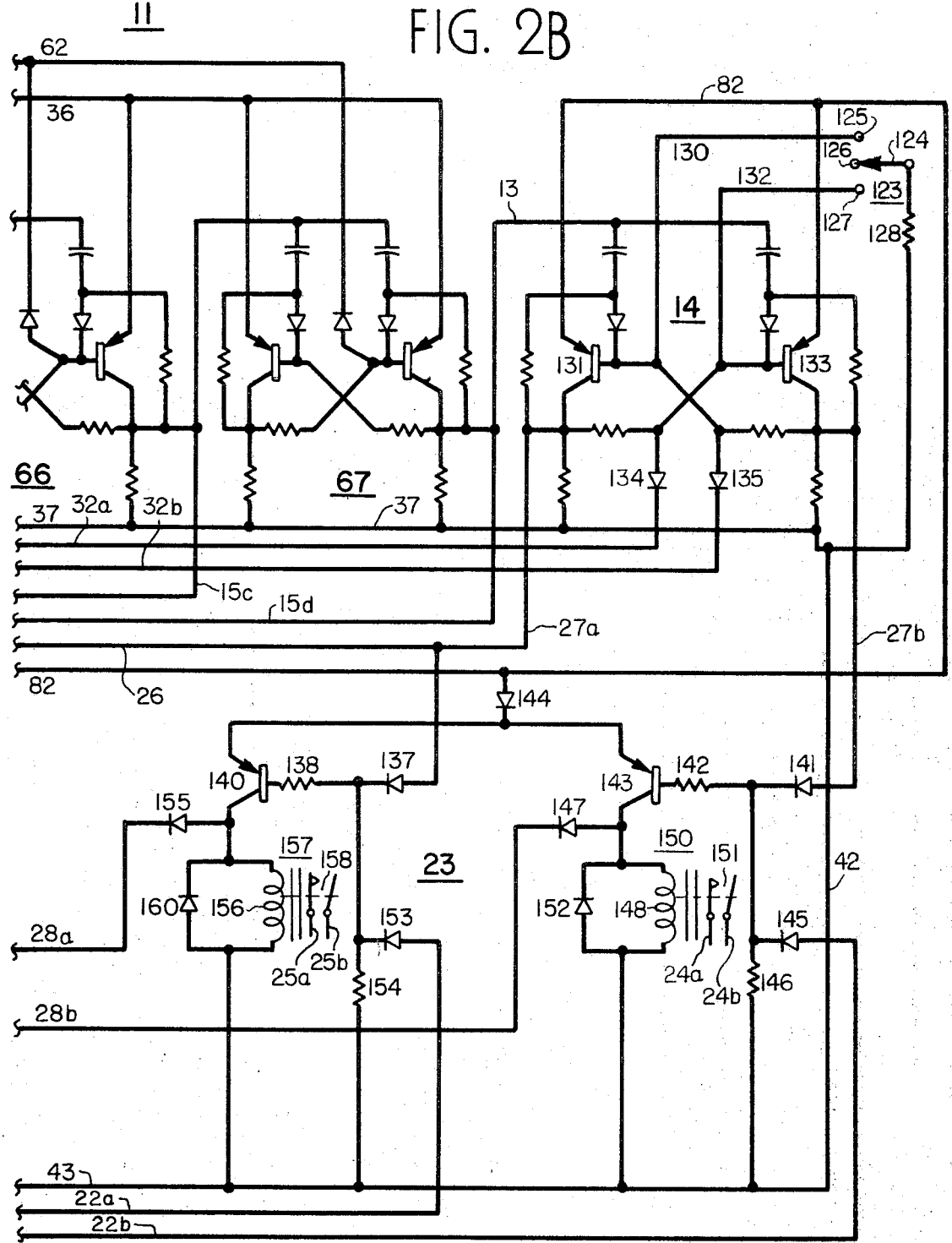

United States Patent Office 3,526,271
Patented Sept. 1, 1970

3,526,271
HEATING-COOLING CONTROL SYSTEM WITH EXTENDED TIME DELAY
Thomas C. Jednacz and Alwin B. Newton, York, Pa., assignors to Borg-Warner Corporation, Chicago, Ill., a corporation of Delaware
Filed Dec. 13, 1968, Ser. No. 783,479
Int. Cl. F25b 29/00
U.S. Cl. 165—26         6 Claims

ABSTRACT OF THE DISCLOSURE

An oscillator provides spaced apart timing pulses to a divide-by-16 counter circuit which issues an output pulse, when full, to a flip-flop memory circuit. In turn the memory circuit passes a signal to an output control circuit, which also receives an input signal from a heat sensing and logic inverter stage. The output control circuit provides regulating signals to call for heating or cooling, and also passes a signal to a reset circuit which resets the counter circuit. A heat anticipation circuit operates, responsive to indications both that the counter circuit is full and that the system is calling for cooling, to pass a signal to the heat sensing and logic inverter stage which increases the amount of heat anticipation provided to the thermostat.

BACKGROUND OF THE INVENTION

Figure 1:
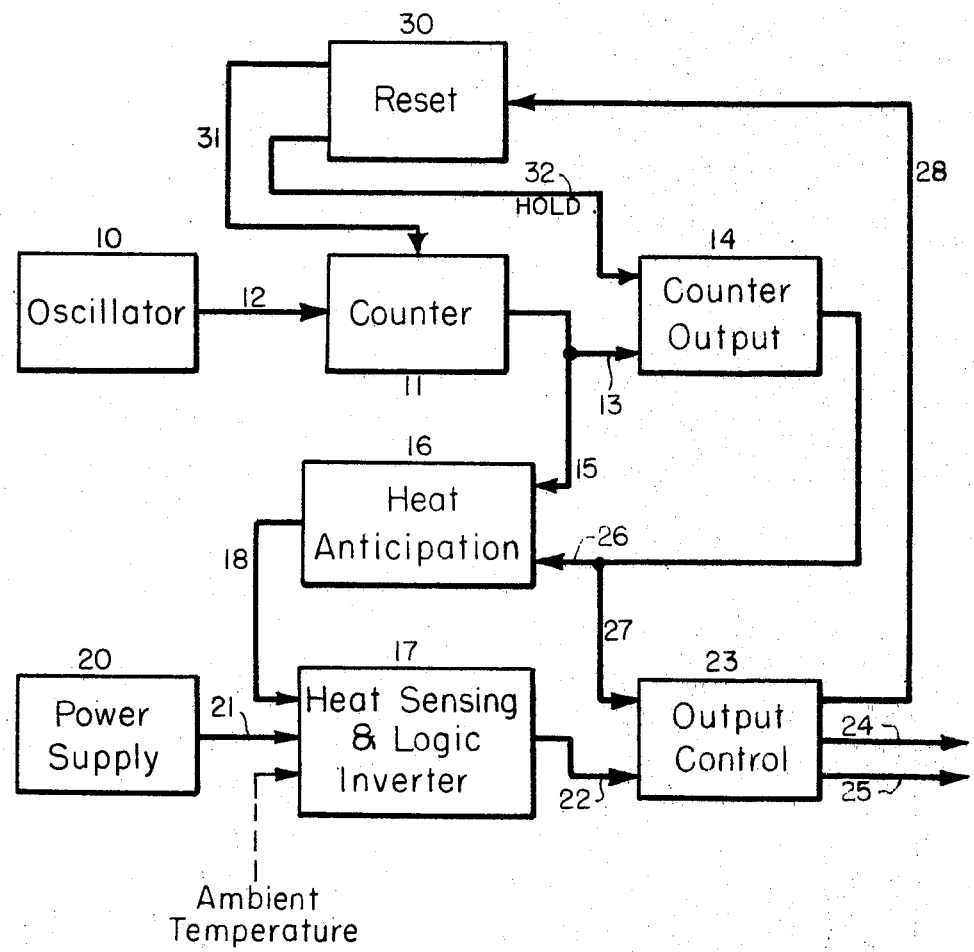

There has long been a need in the environmental control art for an economical and reliable thermostatically controlled heating-cooling system with an extended time delay, especially for use in the field of residential air conditioning. Those skilled in the control art recognize that a system can be made too responsive or sensitive to the variable to be controlled, causing fast response which in turn effects "hunting" or oscillation around the desired control point in lieu of a stable, controlled environment with minimum switching and oscillating. It is therefore a principal consideration of the present invention to provide an economcal and effective control system with an extended time delay arrangement, to provide time delay periods greater than an hour in length, for minimizing undesired cycling in a residential air conditioning system.

It is another important consideration to provide a control system which avoids being "fooled" by thermostat calling for heat under certain conditions. For example, on a cool, damp day when the air conditioning system is being used primarily for dehumidification, at the end of the extended cooling cycle the thermostat may be calling for heat. Under these conditions, the system ideally should provide some heat anticipation of the extended cooling cycle, allowing the system to stay in the cooling mode and effect dehumidification. It is this provision of heat anticipation which is another significant consideration of this invention.

SUMMARY OF THE INVENTION

The heating-cooling control system of the present invention includes an extended time delay arrangement for providing output control signals over respective heating and cooling output circuits to maintain associated heating and cooling equipment in either the heating mode or the cooling mode for a complete cycle corresponding to the extended time delay period. This control system comprises a counter circuit, which is operative to provide a single output pulse responsive to receipt of a predetermined plurality of input timing pulses, and means connected to provide a series of input timing pulses to this counter circuit. A counter output flip-flop circuit or memory stage is coupled to the counter circuit, and the flip-flop circuit provides control signals indicating operation in either the heating mode or in the cooling mode. An output control circuit is provided with output connections for signalling associated equipment to operate either in the heating mode or in the cooling mode. This output control circuit is connected to receive the control signals from the counter output flip-flop circuit. A heat sensing and logic inverter circuit is connected to sense ambient temperature and to pass an output signal to the output control circuit. A reset circuit is connected to receive an output signal from the output control circuit each time a cycle is completed, and thereupon to apply a reset signal to the counter circuit. Means is also provided for energizing the heating and cooling control system of the invention.

In a preferred embodiment the control system of this invention includes a heat anticipation stage. The input circuit of the heat anticipation stage is coupled to the counter circuit to provide an indication when the counter is full, and the input circuit is also coupled to the counter output flip-flop circuit to provide an indication when the system is calling for cooling. When both these indications are present in the input circuit, the heat anticipation stage supplies an input signal to the heat sensing and logic inverter circuit to provide an additional measure of heat anticipation to the heat sensing unit before the expiration of the cooling period.

THE DRAWINGS

In the several figures of the drawings like reference numerals identify like elements, and in the drawings:
FIG. 1 is a block diagram of a control system according to the inventive teaching; and
FIGS. 2A and 2B are schematic diagrams which, taken together, provide a detailed illustration of the system shown generally in FIG. 1.

GENERAL SYSTEM DESCRIPTION

In the general block diagram of FIG. 1, the extended time period is precisely achieved by the combination of oscillator circuit 10 and counter circuit 11. The input circuit represented by conductor 12, between oscillator circuit 10 and counter circuit 11, represents a means connected to provide a series of input timing pulses to counter circuit 11. In a preferred embodiment counter circuit 11 was comprised of a plurality of binary counting circuits which together provided a divide-by-16 counter. With input timing pulses spaced approximately five minutes apart, an output pulse issues from counter circuit 11 after one hour and 20 minutes. This output pulse is applied over line 13 to counter output flip-flop circuit 14, which in effect functions as a memory stage, and an output signal is also provided over line 15 to heat anticipation stage 16 to "tell" stage 16 when the counter circuit 11 has accummulated a full count.

Heat sensing and logic inverter stage 17 receives an input signal from heat anticipation stage 16 over line 18, and receives another input signal denoting the ambient temperature from a thermostat or similar heat sensing unit. Power supply circuit 20 is shown connected over line 21 to stage 17 for convenience, because in the larger schematic showing these two circuits are adjacent each other. Those skilled in the art will appreciate that in fact energy is supplied to all the circuits shown in FIG. 1 from the power supply, which may be a rectifier circuit, battery, fuel cell or any other suitable energizing unit.

Heat sensing and logic inverter stage 17 passes a control signal over line 22 to the output control stage 23. If the system starts in a certain mode, for example, the heating cycle, the system will stay in that mode if the thermostat in stage 17 calls for heating at least once during the cycle duration as determined by oscillator 10 and counter circuit 11. Output signals are passed from the output connections of output control circuit 23 over conductors 24 and 25 to the associated heating and cooling units (not shown), which are energized and operated in a conventional manner. However if the stage 17 has not indicated a call for heat during the cycle duration, the system will switch automatically to the cooling mode at the expiration of the heating cycle and reset the system to commence counting for another cycle.

Counter output flip-flop circuit 14 passes a signal over line 26 to heat anticipation stage 16, and another signal over line 27 to the output control stage 23. As the system is switched from heating to cooling or vice versa, at the expiration of one timing cycle, an output signal is passed over conductor 28 to reset stage 30 which in turn passes a reset signal over line 31 to reset all the stages in counter 11. In addition a "hold" signal is applied over conductor 32 to the counter output flip-flop 14 from the reset circuit during the reset period. This hold signal avoids undesired switching of memory stage 14 by transients produced in resetting counter circuit 11.

Heat anticipation stage 16 is signalled over line 15 when the counter is full, and is signalled over line 26 when stage 14 indicates the system is calling for cooling. Under these conditions, during the time of approximately five minutes between the last two pulses from oscillator 10 during a timing cycle, heat anticipation stage 16 passes a signal over line 18 which provides additional heat anticipation to the thermostat in stage 17. In this way the control system determines whether heat is really needed at the expiration of the cooling cycle, whether it should in fact remain in the cooling mode, and if it does switch, it prevents temperature overshoot during the first heating cycle.

DETAILED DESCRIPTION OF THE INVENTION

FIG. 2A depicts oscillator circuit 10, the first and second binary counting stages 35 and 65 of counter circuit 11, and half of the third stage 66, power supply 20, heat sensing and logic inverter circuit 17, reset circuit 30, and heat anticipation stage 16. A pair of energizing conductors 36 and 37 apply a unidirectional potential to circuits 10 and 11. Conductor 36 is coupled over a conductor 38 and resistor 40 to conductor 41, one of the output conductors of power supply circuit 20. As shown in part in FIG. 2B, the other conductor 37 is coupled over a conductor 42 to the other input conductor 43 in the power supply circuit. For purposes of describing this invention, conductors 41, 43 are considered as the means for energizing the control system of this invention, for any of a variety of sources can be utilized in place of illustrated power supply 20. Filter capacitor 44 is coupled between conductors 36 and 37 to smooth the voltage applied to these circuits. In a preferred embodiment, with an alternating 24-volt potential applied over input conductors 73, 74 of the power supply, a D-C potential of approximately 16 volts was applied between conductors 36 and 37.

Oscillator circuit 10 includes a unijunction transistor 45 having its base-two connection coupled through a resistor 46 to conductor 36, and its base-one connection coupled through a resistor 47 to conductor 37. The emitter of transistor 45 is coupled to a common terminal 48. A potentiometer 50 and a resistor 51 are coupled in series between conductor 36 and terminal 48, and a capacitor 52 is coupled between terminal 48 and conductor 37. Accordingly adjustment of potentiometer 50 varies the charging time of capacitor 52 and correspondingly regulates the firing point of unijunction transistor 45, to afford regulation of the timing of the input pulses passed from oscillator circuit 10 over conductor 12 to the first binary stage 35 in the counter circuit 11.

Those skilled in the art will appreciate that binary stage 35 is a conventional multivibrator or flip-flop circuit comprising a pair of transistors 53, 54, one of which is normally conducting and the other of which is nonconducting. Each time an input timing pulse is received over conductor 12, the input pulse is applied through capacitor 55 and diode 56 to the base of transistor 53, and the input pulse is simultaneously applied through capacitor 57 and diode 58 to the base of transistor 54. This simultaneous application of the timing pulse to both bases effects a rapid switching in a well known manner, such that the previously nonconducting transistor is rapidly gated on and the previously conducting transistor is thereupon rapidly shut off. Each of the subsequent counting circuits in the complete counter 11 is constructed and operates in a completely identical manner and no further exposition of this conventional circuitry will be given. At the end of the specification a component identification table is set out to enable those skilled in the art to provide the structure and operation of counting circuit 11.

A single output signal is issued from a first binary stage 35 over conductor 60 to the next counting stage for every second input timing pulse received over conductor 12. The same output signal is applied over conductor 15a to a diode 110 in the first input circuit of the heat anticipation stage 16, as will be more fully described hereinafter. Reset conductor 62 receives a reset signal over conductor 31 from reset stage 30, and applies the reset signal through a diode 64 to the base of transistor 54 to effect a reset of this binary counting stage. The same reset signal is concomitantly applied from conductor 62 over a corresponding diode in each of the successive binary counting stages 65, 66, and 67.

It is apparent that the output signal from the last binary counting stage 67 applied over conductor 13 to the counter output flip-flop circuit 14 is issued once for each 16 timing input pulses received from the oscillator circuit 10. In addition the state of binary circuit 65 is indicated by a signal passed over conductor 15b and diode 111 in the first input circuit of heat anticipation stage 16; a signal denoting the state of stage 66 is passed over conductor 15c and diode 112; and another signal, indicating the state of the last binary stage 67, is passed over conductor 15d and diode 113 to the first input circuit of heat anticipation stage 16.

In power supply 20 a pair of input conductors 73, 74 pass the applied alternating potential difference to the input connections of a bridge circuit which comprises diodes 75, 76, 77 and 78 interconnected in a conventional manner. The output connections of the bridge circuit are coupled to energizing conductors 41 and 43 between which a filter capacitor 80 is provided. Conductor 41 is coupled over resistor 40 to conductor 38 for energizing the oscillator and counter circuits, and conductor 41 is also coupled over another resistor 81 and a conductor 82 to the other circuits. A Zener diode 94 is coupled between conductors 82, 43 to stabilize the voltage between these conductors at approximately 11 volts.

Heat sensing and logic inverter stage 17 includes a thermostat unit 83, one end of which is coupled to conductor 41 and the other end of which is coupled through a series circuit including resistors 84, 85 to conductor 43. Thermostat unit 83 may be a conventional component comprising a bimetallic element 86 and a heating resistor 87. The logic inverter portion includes an NPN type transistor 88 having its base coupled through a resistor 90 to the common connection between resistor 84 and thermostat heating resistor 87. This common connection is also coupled over a first output conductor 22a to the cooling control portion of output control circuit 23 (FIG. 2B). The collector of transistor 88 is coupled through a resistor 92 to energizing conductor 41, and the collector is also coupled to another output conductor 22b for passing a signal to the heating control portion of output control stage 23. The emitter of transistor 88 is connected directly to ground conductor 43.

The logic inverter portion including transistor 88 basically inverts the voltage signal which would otherwise be provided over conductors 22a and 22b to the output control circuit 23. For example, if the thermostat 86 is closed to call for heat, a positive signal voltage is applied over conductor 22a to diode 153 in the output control circuit. However NPN type transistor 88 is conducting under these conditions, so that its collector is virtually at ground potential, and no voltage is delivered over conductor 22b to diode 145 in output control circuit 23. As will be seen hereinafter these signals cooperate in actuating the control relays in stage 23. It is apparent that with the opening of bimetallic element 86, the potential on conductor 22a goes virtually to ground, and the potential applied over conductor 22b becomes a positive signal voltage.

Reset circuit 30 comprises separate NPN type transistors 95, 96 which are controlled by signals received over respective conductors 28a and 28b from the output control circuit 23 (FIG. 2B). A resistor 100 is coupled between input conductor 28a and the base of transistor 95, and another resistor 101 is coupled between conductor 28b and the base of transistor 96. Resistor 102 is coupled between ground conductor 43 and the base of transistor 95, and resistor 103 is coupled between conductor 43 and the base of transistor 96. The collector of transistor 95 is coupled through a series circuit including resistor 104, diode 105 and another resistor 106 to reset conductor 31, for passing a reset signal over this conductor to conductor 62 for effecting reset of all the binary stages in counting circuit 11. Similarly the collector of transistor 96 is coupled over a series circuit including resistor 107, diode 108 and resistor 106 to the reset conductor 31. Conductors 32a, 32b extend a hold signal through diodes 134, 135 to the bases of transistors 131, 133 in the memory circuit 14.

In operation reset circuit 30 receives information in the form of output signals over output conductors 28a, 28b from output control circuit 23. If either relay in output control circuit 23 is energized, it is desired that the control sysem reset the timing cycle (by resetting all the binary counting stages in counting circuit 11) when the timing cycle is completed, whether in the heating mode or cooling mode; counting circuit 11 will be reset and the pulses from oscillator 10 will again commence to be accumulated in circuit 11 as another timing cycle is begun. If the thermostat 86 is calling for cooling and the equipment is in the cooling mode, a signal is received over conductor 28a which renders transistor 95 conductive and passes a negative-going signal over conductor 32a to maintain transistor 133 conductive and keep the equipment in the cooling mode. At this time the timing cycle is reset, by a signal passed over conductor 31 to all the binary counting circuits, and another timing cycle is initiated. Similarly, if the equipment is in the heating mode and the thermostat is calling for heat, at the expiration of a cycle transistor 96 in the reset circuit is conductive and a negative-going signal is passed over hold conductor 32b and diode 135 to maintain transistor 131 conductive and keep the equipment in the heating mode, while the reset signal passed over conductor 31 is effective to reset all the binary counting stages in circuit 11.

It is of course manifest that if the thermostat unit does not call for heating during a cycle when the equipment is in the heating mode, or does not call for cooling during a cycle when the equipment is in the cooling mode, then at the expiration of the time cycle no hold signal is applied over either of conductors 32a and 32b, and the output pulse which issues from counting circuit 11 over conductor 13 to the flip-flop circuit 14 is effective to reset this flip-flop circuit and change the system operation over to the opposite mode.

Heat anticipation circuit 16 includes two input circuits. The first input circuit comprises conductors 15a, 15b, 15c and 15d, respectively, connected through diodes 110, 111, 112 and 113 to common conductor 114. From the previous explanation of counter circuit 11, it is apparent that information as to when the counter circuit 11 is full is provided over this first input circuit, and over resistor 117 to the base of PNP type transistor 118. The second input circuit for heat anticipation stage 16 includes conductor 26, coupled over another diode 115 to the common conductor 114, to provide a signal indicating that counter output flip-flop circuit 14 is in a state signifying that the system is in a cooling mode. The common conductor 114 is coupled through a resistor 116 to ground conductor 43, and the emitter of transistor 118 is connected directly to conductor 82. The collector of this transistor is coupled through a resistor 120 to ground conductor 43 and the collector is also coupled through another resistor 121 to the base of an NPN type transistor 122, the emitter of which is grounded. The collector of transistor 122 is coupled over a conductor 18 to the common connection between resistors 84 and 85 in the heat sensing and logic inverter arrangement 17.

To consider operation of heat anticipation stage 16, it is noted that each of the binary counting stages such as 35, 65, 66 and 67 in the counting circuit 11 is initially in a condition in which the right-hand transistor (such as 54) is conducting and the left-hand transistor (such as 53) is nonconducting. This is accomplished by a negative-going reset pulse applied from reset circuit 30 over conductors 31 and 62 to all the diodes, such as 64, to reset each binary counting stage. After reset, upon receipt of the 15th input pulse from the oscillator 10, the counter is full, that is, all of the counting stages have the left-hand transistor conducting and the right-hand transistor nonconducting. Under these conditions the level of the voltage applied from the collector of transistor 54 over conductor 15a to the anode of diode 110 is substantially ground potential, and thus no signal voltage is passed through this diode and over resistor 117 to the base of transistor 118. The same conditions obtain for the remainder of the first input circuit of heat anticipation stage 16, including conductors 15b, 15c, and 15d, and diodes 111, 112, and 113. If the system is at that time calling for cooling, transistor 133 in the counter output memory stage 14 is conductive and transistor 131 is nonconductive, so that a potential of substantially ground level is applied from the collector of transistor 131 over conductor 26 and diode 115 in the second input circuit of stage 16.

With no positive potential applied over any portion of the composite input circuit, this "tells" heat anticipation stage 16 two things: first, that the counter circuit 11 is full, because the next input timing pulse will recycle it to the initial condition; and second, that the system is presently in the cooling mode. Under these conditions transistor 118 is biased for conduction, so that it is gated on during the last five minutes (equal to the spacing of the timing pulses being supplied from the oscillator 10) of the timing period. Conduction of transistor 118 provides a positive-going signal over resistor 121 which gates on transistor 122, and in turn effectively shorts out resistor 85. This provides additional current flow through thermostat heating resistor 87 during this terminal portion of the timing cycle, to prevent an erroneous switch-over to the heating mode when the system should in fact remain in the cooling mode. This additional heating also conditions the thermostat to require a short heating cycle on the first one or two cycles after change-over. This operation is requisite to prevent over-run, because heating equipment operates at 100% of capacity, whereas only a small percentage of this total capacity is required at the time of changeover.

FIG. 2B depicts half of binary stage 66 and all of binary counting stage 67 in circuit 11, the counter output flip-flop circuit 14, and output control circuit 23. The output flip-flop or memory stage 14 is essentially another multivibrator circuit, the same as the basic circuit in each of the binary counting stages 35, 65, 66 and 67. However instead of a reset circuit with a diode, such as diode 64 (FIG. 2A) in the first counting stage 35, reset for the memory stage 14 is effected by a three-position manual switch 123 which includes a movable arm 124 and three fixed contacts 125, 126 and 127. Movable contact 124 is coupled through a resistor 128 to ground conductor 42. Fixed contact 126 is blank, fixed contact 125 is coupled over conductor 130 to the base of transistor 131 in stage 14, and the remaining fixed contact 127 is coupled over conductor 132 to the base of the other transistor 133 in flip-flop stage 14. Accordingly actuation of switch 123 affords override of the cyclical control arrangement, allowing the system to be reset to heating mode by application of ground potential over contacts 124, 125 to the base of transistor 131, or to cooling mode by application of ground potential over contacts 124, 127 to the base of transistor 133.

A first output signal is provided from flip-flop circuit 14 over conductor 27a, diode 137 and resistor 138 to the base of a PNP type transistor 140 in the cooling control portion of output control circuit 23, and the same output signal from conductor 27a is also applied over conductor 26 as previously described to the heat anticipation circuit. The other output signal is provided from the right-hand portion of counter output memory stage 14 over conductor 27b, diode 141 and resistor 142 to the base of a PNP type transistor 143 in the heating control portion of circuit 23. The emitters of transistors 140, 143 are connected together and coupled through a diode 144 to conductor 82.

Another diode 145 is coupled between conductor 22b and the common connection between diode 141, resistor 142 and another resistor 146; the other side of resistor 146 is connected to ground conductor 43. The collector of transistor 143 is coupled through a diode 147 to conductor 28b, and the collector is also coupled through winding 148 of heating relay 150 to conductor 43. Relay 150 also comprises a normally open contact set 151 coupled to a pair of conductors 24a, 24b for passing a heating control signal to an associated heating unit (not shown). A protective diode 152 is coupled in parallel with winding 148 of the heating relay.

In the cooling control portion of circuit 23, a diode 153 is coupled between conductor 22a and the common connection between diode 137, resistor 138 and resistor 154; the other side of resistor 154 is grounded. The collector of transistor 140 is coupled through a diode 155 to conductor 28a, and the collector is also coupled through winding 156 of cooling relay 157 to ground. Relay 157 also includes a normally open contact set 158 which, when closed, passes a cooling control signal over conductors 25a, 25b to an associated cooling unit (not shown). A protective diode 160 is coupled in parallel with relay winding 156.

Each of the heating and cooling control circuits in output circuit 23 is connected so that its respective relay is energized in the absence of positive signal voltages in the two input portions of its control circuit. For example, if memory stage 14 at a given time is indicating the system should be in the cooling mode, transistor 133 in that stage is conducting and a positive signal is applied over conductor 27b, diode 141 and resistor 142 to the base of transistor 143, maintaining this transistor nonconductive and relay 150 deenergized. With transistor 133 conducting, transistor 131 is nonconducting and ground potential is applied over conductor 27a to diode 137. If thermostat 87 (FIG. 2A) is calling for cooling the bimetal 86 is open as shown, so that ground potential is applied over conductor 22a to diode 153, and a positive potential is applied over conductor 22b through diode 145 and resistor 142 to the base of transistor 143. Under these conditions transistor 140 is rendered conductive, and current flows through relay winding 156 to operate relay 157 and close contact set 158 to operated the associated cooling mechanism. As relay 140 conducts a positive-going pulse is passed through diode 155 and over conductor 28a to reset circuit 30, to cooperate in the previously described reset operation. Heating relay 150 is energized in an analogous manner, with ground voltages supplied to diodes 141 and 145, indicating that transistor 131 in memory stage 14 is conducting and thermostat 86 in the heat sensing and logic inverter stage 17 is calling for heat.

SUMMARY

The control system of this invention provides a reliable and economical timing cycle arrangement which finds utility in residential air conditioning applications. It has been found that efficient operation is achieved with the timing cycle being of the order of one and one-half hours. With a divide-by-16 arrangement in counting circuit 11, this indicates the interval between successive timing pulses from oscillator 10 should be approximately five minutes, 37.5 seconds. Adjustment of potentiometer 50 in the oscillator circuit is effective to set the timing of the input pulses to a desired interval, and a precise regulation is not requisite to achieve the benefits of the invention. The term "extended time delay" as used herein and in the appended claims means a timing cycle of substantially one hour in duration, or values within an order of magnitude of one hour.

To assist those skilled in the art to make and use the invention, and in no sense by way of limitation, a table of circuit components and identifications is set out below. Those skilled in the art will appreciate that other components can be substituted to achieve the overall system operation described above and defined in the appended claims. For example the continued increase in the variety of circuits and circuit combinations available as integrated circuits, with the decreasing cost as volume production of these circuits steadily rises, makes feasible the replacement of all the semiconductors identified below as discrete components by the appropriate integrated circuit combinations.

| Component: | Identification or value |
| --- | --- |
| 45 | 2N2646. |
| 88 | 2N3975. |
| 95, 96 | 2N3607. |
| 118, 131, 133, 140, 143, | 2N404A. |
| 122 | 2N3402. |
| 94 | Z46L12B. |
| All other diodes | 1N483A. |
| 44, 80 | 500 µf., 25 volts. |
| 52 | 100 µf., 25 volts. |
| 50 | 0.5M ohms. |
| 40 | 200 ohms. |
| 46 | 470 ohms. |
| 47 | 220 ohms. |
| 51 | 3.3M ohms. |
| 81 | 180 ohms, 3 watts. |
| 84 | 75 ohms, 20 watts. |
| 85 | 25 ohms, 5 watts. |
| 90, 106, 116, 121, 138, 142, 146, 154 | 10K ohms. |
| 92, 102, 103, 104, 107, 117, 120, 128 | 1K ohms. |
| 100, 101 | 4.7K ohms. |

While only a particular embodiment of the invention has been shown and described, it will be apparent to those skilled in the art that various changes and modifications may be made therein, without departing from the invention in its broader aspects. Therefore the aim is to cover all such changes and modifications as may fall within the true spirit and scope of the invention.

What is claimed is:

1. A heating-cooling control system with an extended time delay period for providing output control signals over heating and cooling output circuits to maintain associated equipment in either the heating mode or the cooling mode for a complete cycle corresponding to said extended time delay period, comprising:

a counter circuit, operative to provide a single output pulse responsive to receipt of a predetermined plurality of input timing pulses;

means connected to apply a series of input timing pulses to said counter circuit;

a counter output flip-flop circuit, coupled to said counter circuit, for providing control signals indicating operation either in the heating mode or in the cooling mode;

an output control circuit, having output connections for signalling associated equipment to operate in either the heating mode or in the cooling mode, connected to receive said control signals from the counter output flip-flop circuit;

a heat sensing and logic inverter circuit, connected to sense ambient temperature and to pass an output signal to said output control circuit;

a reset circuit, connected to receive an output signal from said output control circuit each time a cycle is completed, and thereupon to apply a reset signal to said counter circuit; and means for energizing said control system.

2. A heating-cooling control system as claimed in claim 1, in which said reset circuit includes means for applying a hold signal to said counter output flip-flop circuit, to prevent undesired switching of the counter output flip-flop circuit during sequential switching as the input timing pulses are accumulated in said counter circuit.

3. A heatng-cooling control system as claimed in claim 1 in which said control system further includes a heat anticipation stage, including an input circuit for actuating said heat anticipation stage responsive to indications both that said counter circuit is full and that said counter output flip-flop circuit signifies that the control system is calling for cooling, such that said heat anticipation stage supplies an input signal to said heat sensing and logic inverter circuit to increase the level of heat anticipation before the expiration of the cooling period, and conditions the thermostat to require a short heating cycle on at least the first cycle after changeover to prevent overrun.

4. A heating-cooling control system as claimed in claim 1 in which said counter circuit includes $n$ stages connected in a divide-by-$2^n$ circuit, where $n$ is any positive integer, and said input timing pulses are spaced at least at substantially five-minute intervals, to provide cycling of the counter circuit over an extended time period greater than one hour.

5. A heating-cooling control system for providing output control signals over heating and cooling output circuits to maintain associated heating and cooling equipment either in the heating mode for an extended time delay period or in the cooling mode for the same extended time delay period, comprising:

a counter circuit, including a plurality of binary circuits coupled in series, operative to receive input timing pulses and issue a single output pulse after a predetermined plurality of the input timing pulses have accumulated;

means connected to apply a series of input timing pulses, spaced apart in time by an interval of approximately five minutes, to said counter circuit;

a counter output memory stage, coupled to said counter circuit, connected to provide control signals denoting operation either in the heating mode or in the cooling mode;

an output control circuit, having output connections for signalling associated equipment to operate either in the heating mode or in the cooling mode, having a first input circuit connected to receive said control signals from the counter output memory stage, and having a second input circuit;

a heat sensing and logic inverter circuit, including a thermostat connected to sense ambient temperature, operative to pass an output signal to said second input circuit of the output control circuit;

a reset circuit, connected to receive an output signal from said output control circuit each time a cycle is completed, and thereupon to apply a reset signal to said counter circuit, including means for applying a hold signal to said counter output memory stage during reset of the counter circuit, thus preventing undesired switching of the counter output memory stage as the binary circuits in said counter circuit are reset; and means for energizing said control system.

6. A heating-cooling control system as claimed in claim 5 in which said control system further includes a heat anticipation stage, including a first input circuit for providing an indication that said counter circuit is full and a second input circuit for providing an indication that said counter output memory stage signifies that the control system is calling for cooling, such that when both these indications are present the heat anticipation stage supplies an input signal to said heat sensing and logic inverter circuit to provide heat anticipation to said thermostat during a time interval corresponding to the interval between the last two input timing pulses received in the counter circuit at the termination of the cooling cycle, and prepares the thermostat to require only a short heating cycle in at least the first cycle after changeover to obviate temperature overshoot.

References Cited

UNITED STATES PATENTS 3,221,257  11/1965  Ohlson _____ 236—78
3,386,498  6/1968  Funfstuck _____ 165—26

ROBERT A. O'LEARY, Primary Examiner

C. SUKALO, Assistant Examiner

U.S. Cl. X.R.

236—78